Oct. 29, 1963
S. SCYOCURKA
3,108,472
TORQUE GAUGE
Filed Dec. 10, 1959
2 Sheets-Sheet 1
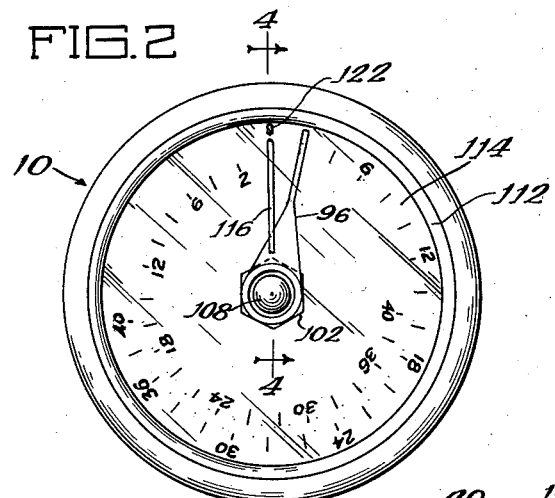
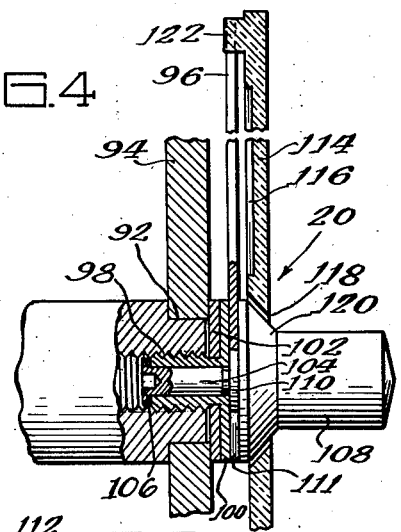
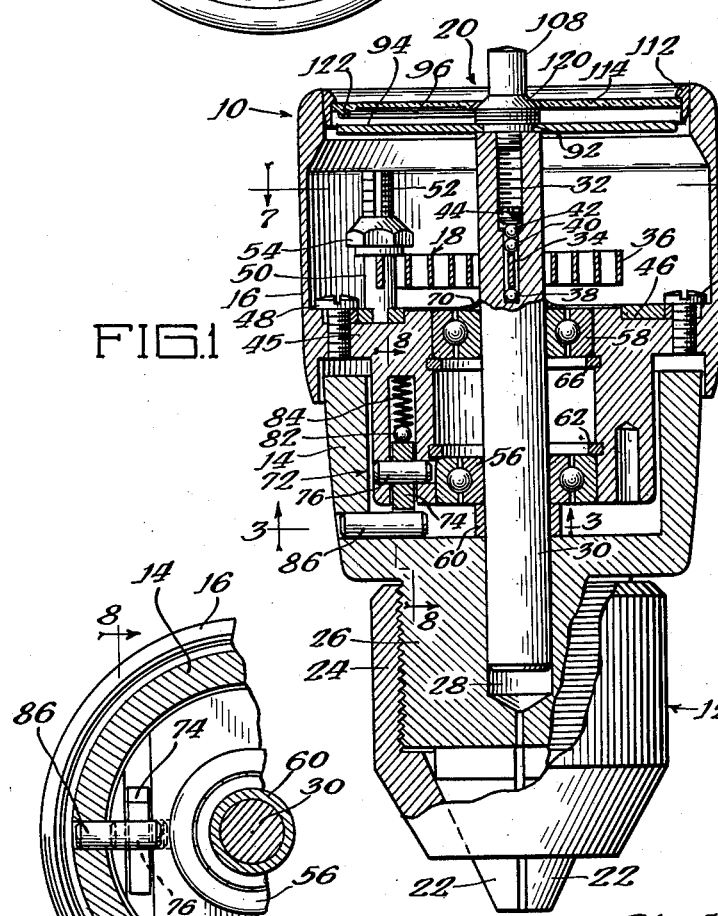
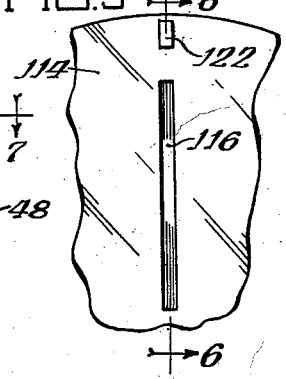
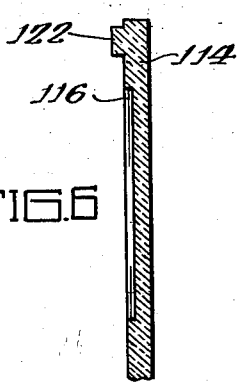
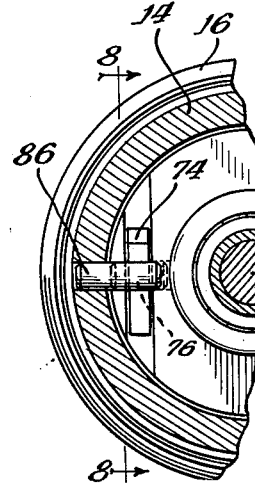
Inventor:
Stephen Scyocurka
By: Graf, Nirman & Burmeister
Attorneys

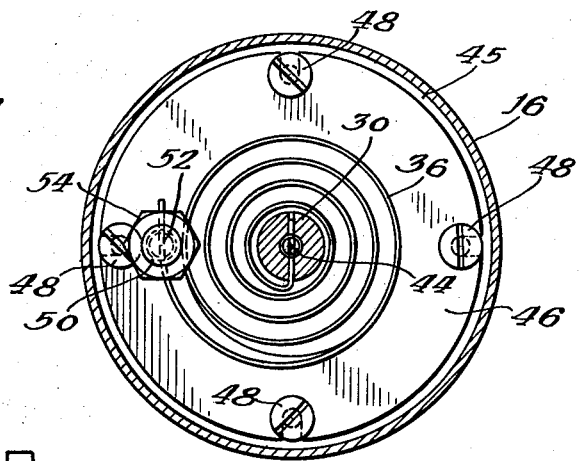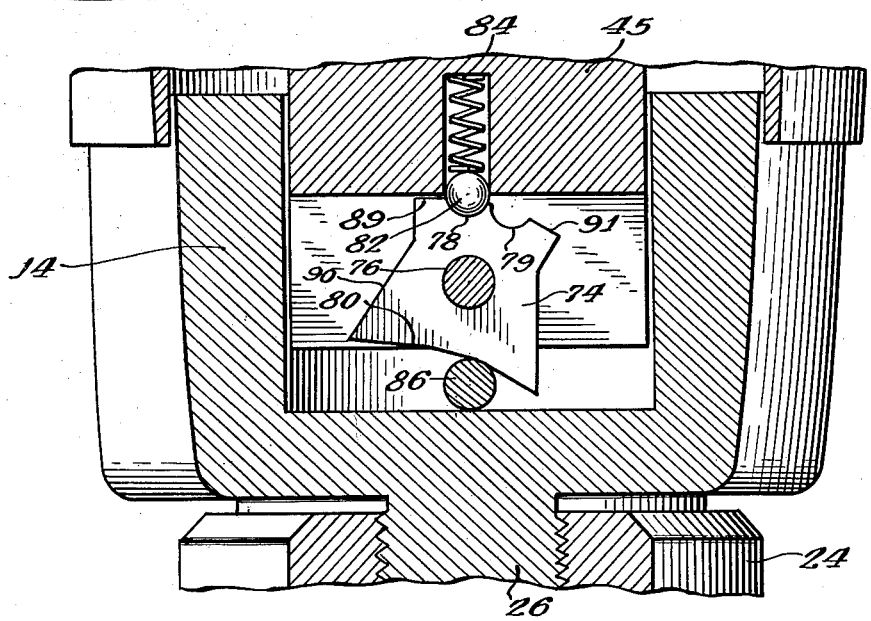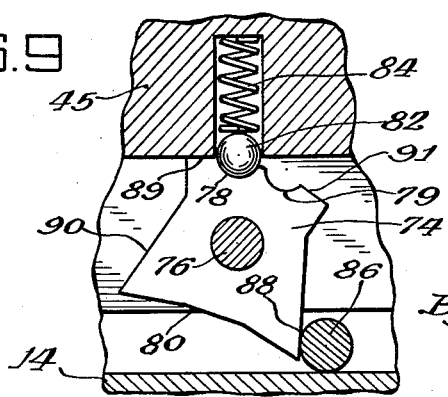
Inventor:
Stephen Scyocurka

United States Patent Office 3,108,472
Patented Oct. 29, 1963

3,108,472
TORQUE GAUGE
Stephen Scyocurka, Framingham, Mass., assignor to Waters Manufacturing, Inc., Wayland, Mass., a corporation of Massachusetts
Filed Dec. 10, 1959, Ser. No. 858,676
10 Claims. (Cl. 73—139)

This invention relates to an improved torque gauge and more specifically to a bidirectional torque gauge having a maximum reading indicator indicative of the maximum reading after the maximum torque in either direction is relieved.

Torque gauges are used in a variety of applications, such as measurement of the torque of an electric motor or the torque required to turn control knobs and adjustment means on instruments. In most instances, the running torque is substantially less than the starting torque, and the starting torque is applied only instantaneously so that it is difficult to obtain a precise reading of the maximum torque developed or required. Various forms of maximum reading indicators have from time to time been used on meters and gauging instruments, but they are not fully satisfactory for use on torque gauging devices, particularly on bidirectional gauges such as those shown in the copending application of Robert A. Waters and Robert W. Damon, Serial No. 731,572, filed April 21, 1958, now Patent No. 3,057,194, assigned to the same assignee.

It is one of the objects of the instant invention to provide a torque gauge including an improved indicating device which is capable of indicating a maximum torque reading in either a clockwise or a counter-clockwise direction.

It is a further object of the invention to provide a torque gauge including such a maximum reading indicator which is inexpensive to manufacture and durable, and has a high degree of reliability.

For understanding of the means by which the above advantages are obtained and for observation of advantages of the invention over those specifically discussed above, reference is made to the embodiment shown in the appended drawings in which:

FIGURE 1 is a cross sectional view of a torque gauge embodying the instant invention;

FIGURE 2 is a plan view of the indicating portion of the torque gauge shown in FIGURE 1;

FIGURE 3 is a partial cross sectional view taken on line 3—3 of FIGURE 1;

FIGURE 4 is an enlarged partial cross sectional view taken on line 4—4 of FIGURE 2;

FIGURE 5 is an enlarged view of a portion of a window or crystal shown in FIGURE 2;

FIGURE 6 is a cross sectional view of the crystal taken on line 6—6 of FIGURE 5;

FIGURE 7 is a cross sectional view taken on line 7—7 of FIGURE 1;

FIGURE 8 is an enlarged partial cross sectional view taken on line 8—8 of FIGURE 1;

FIGURE 9 is a partial cross sectional view of a stop means shown in FIGURE 8 but in a different condition of the parts; and FIGURE 10 is a plan view of a needle or pointer constituting an element of the device.

Referring now to the drawings and especially to FIGURE 1, the torque gauge 10 shown in cross section is a commercial embodiment of the torque gauge disclosed in the above described copending application of Waters and Damon, to which the present invention is applied. The torque gauge generally consists of a conventional collet chuck 12, a base 14 supporting said chuck, a hollow housing 16 rotatably mounted on the base, a load mechanism generally designated 18 connecting the housing and the base, and an indicating means generally designated 20.

Chuck 12 is a conventional collet chuck which includes a plurality of jaws 22 movably mounted in a collar 24 to engage an appropriate shaft or stem. The collar is in turn threadedly mounted on a bottom portion 26 of base 14.

The base is connected to the housing 16 through the load mechanism 18. The base has a shaft opening 28 in bottom portion 26 extending along a portion of the center line of the base. The opening 28 has a shaft 30 press fitted therein to fix the shaft to the base and the shaft has a threaded opening 32 in its top end with a spring slot 34 cut through the shaft at the bottom of the opening 32.

A spiral spring has its inner portion extending through the opening 34 and a ball 38 supports the spring while a pair of balls 40 and 42 are positioned between the spring and a set screw 44 which is threadedly mounted in opening 32 and holds the balls against the spring to secure the spring to the shaft.

Hollow housing 16 includes an annular buttress portion 45 which has an adjustment ring 46 movably mounted thereon. A plurality of screws 48, which are threadedly mounted in the buttress portion, engage the adjustment ring 46 to lock the ring in position. The ring supports a post 50 which has a spring slot 52, and a nut 54 is threadedly mounted on post 50. The outer end of spring 36 is held in slot 52 by a nut 54 which tightens down into engagement with the spring.

The buttress portion 45 is connected to the shaft 30 by a pair of roller bearings 56 and 58 to prevent longitudinal movement between the base and the housing. The bearings are positioned by a spacer bushing 60 and locking rings 62, 66 and 70. In this manner, shaft 30 and base 14 are secured to housing 16 so that housing 16 may rotate freely relative to base 14, but any longitudinal motion is prevented.

Inasmuch as the rotation of housing 16 relative to base 14 is restrained by spring 36, which is unstressed in the neutral or zero position, the housing may be rotated relative to the shaft in either a clockwise or a counter-clockwise direction, so that the torque gauge is operative in both directions.

The stop means generally designated 72 includes a generally four sided pawl 74 which is pivotedly mounted on a pawl shaft 76 in the bottom portion of the buttress. The pawl has a pair of notches 78 and 79 in its upper side and a concave engagement surface 80 on its lower side. A ball 82 which is under a load by a spring 84 is constantly urged against the pawl to restrain free movement by the pawl by resting in either of the notches. A stop pin 86 is fixed in the base 14 and engages pawl 74 in its rotational path. As may be seen in FIGURE 8, illustrating the zero or neutral condition, the pin 86 is engageable with the concave surface. As the base rotates relative to housing 16 so that the pin moves to the left from the condition shown in FIGURE 8, ball 82 is seated in notch 78 and the pin will make almost a complete circle and come back to strike stop surface 88 on the pawl as shown in FIGURE 9, further rotation of the pawl being prevented by a stop surface 89 on the pawl. When the load is released, spring 36 returns stop pin 86 to its dead center position in line with the center line of shaft 76. Should a load be applied to move the stop pin to the right, the stop pin will engage the concave surface of the pawl and displace ball 82 against the force of the spring, so that the ball then rests in notch 79. Should the pin make a complete circle the pin will engage stop surface 90 on the pawl and further movement will be prevented by a stop surface 91 on the pawl. Thus, the torque gauge allows substantially full usage of a 360 degree rotation in either direction but still provides a safety means to prevent excess strain on the spring.

Indicating means 20 is mounted on the free end of shaft 30 and at the end of housing 16. Shaft 30 has a dial mounting stud 92 formed on its free end, dial 94, having appropriate markings and a hole in the central portion thereof, being mounted on stud 92. A needle 96 is mounted on the shaft 30 proximate to the indicating surface of dial 94 to provide a maximum reading "memory" indicator for the torque gauge. As was mentioned above, shaft 30 has a threaded opening 32 in the central portion of the shaft. A needle shaft bushing bearing 98 is threadedly mounted in opening 32, and has a hexagonal head 100 by means of which it is tightened into the shaft, a lock washer 102 being interposed between the shaft and the bearing head. A needle shaft 104 is rotatably mounted in the bearing 98. The inner end of the needle shaft is flared to hold the shaft in the bearing. A washer 106 is positioned between the flared end of the shaft and the bearing to permit free rotation of the shaft in the bearing. The washer is made of a low-friction material such as Mylar. A knob 108 is formed integral with the other end of the needle shaft 104. A needle holder 110 is also formed integral with the shaft adjacent to the knob 108. The needle has a split resilient clamp portion 111 which holds the needle frictionally on the holder portion 110.

A bezel 112 is pressed into the open face of the housing 16. A crystal 114 is mounted in the bezel and has a radial line 116 etched therein serving as a visual position indicator. The crystal has a tapered opening in the central portion thereof surrounding an enlarged tapered portion 120 of knob 108 which seats closely on the clamping portion of the needle, hindering the entrance of dust into the instrument, and particularly into the needle bearing, while permitting free rotation of the crystal with respect to the shaft. The crystal also has an integrally formed protuberance or stud 122, on its inner surface near its outer periphery, aligned radially with the marker line 116. The lower portion of the stud 122 and the tip portion of the needle occupy a common rotational path so that the stud can engage the needle to move the needle relative to shaft 30, the radially outermost point of contact minimizing the error produced by the finite width of the stud 122 and the needle. The mechanical load presented by the needle and its bearings can readily be made so low as to merely prevent displacement of the needle by gravity.

In operation, needle 96 acts as a memory needle or a means for indicating the maximum indicated torque in either direction. Prior to the making of a measurement, the knob 108 is turned so that needle 96 engages the left side or right side of stud 122, when looking down on the gauge as in FIGURE 2, depending on the direction of the torque under measurement, the frictional coupling of the needle to the knob previously described limiting the force which can be manually applied to the needle when it strikes the stud. The torque is then applied to the gauge through chuck 12 and the base 14 is rotated against the force of spring 36 while housing 16 is firmly held, so that the dial rotates relative to the crystal (or vice versa in the case of measurement of resistance to torque). The marking indicia 116 then may be observed in co-operation with the indicia on the dial to indicate the torque. Furthermore, the stud 122 engages needle 96 to move the needle relative to the dial 94 and the stud 122 leaves the needle at substantially the maximum displacement or maximum reading. In instances when the maximum torque is applied only for an instant and it is difficult to observe the maximum reading as it occurs, observation of the maximum reading may be made at the leisure of the operator since the needle remains at the greatest displacement.

It is apparent that the instant torque gauge may be used to indicate torque which is operating in either a clockwise or a counter-clockwise direction and substantially the entire range of the gauge may be used. Furthermore, the needle is operative in either direction. The needle imposes such a negligible load that the illustrated construction may be employed for very sensitive measurements without substantially affecting the accuracy; in the illustrated embodiment, as indicated by the calibration markings in FIGURE 2, a range of 2 to 40 inch-ounces is covered. In order that the error introduced may be sufficiently small, the torque resistance or rotational friction of the needle must be at least as low as the lowest torque to be indicated. With the present construction, lower portions of the range may be measured without use of the needle if desired.

While the present invention has been shown and described in the form of a specific embodiment, it is obvious that those skilled in the art may make various modifications and alterations of the herein-disclosed construction without departing from the spirit and scope of the invention. The scope of the patent protection to be given the invention should therefore be limited only by the appended claims.

What is claimed is:

1. In a torque gauge having a base, a housing, and spring means connecting said base and housing, the improvement comprising a shaft mounted on said housing, a dial of substantially greater diameter than the shaft fixed to said shaft, a pointer, means for movably mounting the pointer on the shaft including a rotation bearing substantially smaller than the shaft on the axis thereof, a crystal mounted on said housing proximate to said dial, said crystal having an integrally formed stud protruding therefrom at the circumference thereof and engageable with the pointer to move the pointer relative to the dial either clockwise or counter clockwise, and a mark on said crystal radially aligned with the stud for co-operation with the dial to indicate torque, whereby the movement of the dial relative to the pointer moves the pointer to the maximum reading and leaves the pointer at said reading and the added torque load imposed by the pointer is minimized.

2. An indicating means for use with a torque gauge, said torque gauge including a base and a housing movable relative to said base, a first shaft mounted on said base, a spring connecting said shaft with the housing, said indicating means including a dial of substantially greater diameter than the shaft fixed to said shaft, a needle shaft of substantially smaller diameter than the first shaft movably mounted on the axis of said first shaft, a needle mounted on said needle shaft, a crystal mounted on said housing proximate to said dial, said crystal having a protuberance at the periphery thereof extending toward said needle and engageable therewith, said protuberance engaging said needle to displace said needle relative to the dial, whereby the displacement of the crystal relative to the dial leaves the needle in the maximum displaced position and the added torque load imposed by the needle is minimized.

3. An indicating means for use on a torque gauge, said torque gauge including a base and a housing rotatable relative to the base, said indicating means including a shaft fixed to said base, a dial mounted on the shaft, a bushing threadedly mounted on the axis of said shaft, a needle shaft rotatably mounted on said bushing, a needle mounted on said needle shaft, a crystal mounted on said housing proximate to said dial, said crystal having an indicating mark therein, said crystal movable with said housing in either direction relative to said dial for indicating the torque applied to the base, and said crystal having a protuberance extending therefrom adjacent to the circumference thereof, said protuberance being in alignment with the indicating mark on said crystal and engageable with said needle to move the needle either clockwise or counter-clockwise to indicate the maximum displacement of said needle relative to the dial.

4. An indicating means for use with a torque gauge, said gauge including a base and a housing rotatable relative to said base, a spring secured at one end to said housing, a first shaft mounted on said base and connected to the other end of said spring, said indicating means including a dial mounted on said shaft, a bushing threadedly mounted on the axis of the shaft adjacent to the dial, a needle shaft mounted within said bushing to rotate relative to said bushing and the first shaft in either direction and held in a longitudinal direction at one end by a knob formed integral with said needle shaft and extending away from the first shaft and having a flared portion at the other end, a needle mounted on said needle shaft, and a crystal mounted on said housing proximate to said dial, said crystal having marked indicia for cooperation with the dial to indicate the amount or torque applied to the torque gauge, and having a stud adjacent to the periphery thereof extending outwardly to engage the needle, said knob extending through the center of the crystal to provide externally operable means for rotating the needle relative to the dial and the crystal, whereby a torque applied to the torque gauge moves the dial relative to the crystal and the movement of the crystal relative to the first shaft moves the needle relative to the dial, so that when the torque is released, the needle is left at the maximum displacement indicating the maximum torque applied to the gauge, and the added torque load imposed by the needle is minimized.

5. An indicating device for use with a torque gauge having two parts movable relative to each other in response to a torque applied to the gauge, said indicating device including a dial having indicating indicia on its face, said dial fixed relative to one part of said torque gauge, a crystal having indicating indicia integral therewith co-operative with the indicating indicia of said dial for indicating the amount of torque applied to the torque gauge, said crystal mounted on the end of the other part of said torque gauge and movable therewith relative to the dial, a needle pivotally mounted on the center of the end of the first mentioned part of the torque gauge wholly beneath the crystal and movable relative to the dial and the crystal, means mounted on said crystal at the periphery thereof for engaging the needle and moving the needle relative to the dial to the maximum reading of the crystal relative to the dial and leaving the needle at the maximum displaced position, and an operating member coupled to said needle for returning the needle to its original position after being displaced and for selectively positioning the needle to be operative in either a clockwise or a counter-clockwise direction.

6. An indicating mechanism for use with a torque gauge having two members rotationally movable relative to each other, said indicating mechanism including a dial fixed on one member of said torque gauge, a needle movably mounted centrally of the end of the same member of said torque gauge and co-operative with the dial for indicating a reading, a crystal mounted on the other member of said torque gauge overlying the dial and the needle, said crystal having a mark indicia integral therewith co-operative with the dial to indicate torque, a protuberance integral with the crystal and engageable with the needle to displace the needle relative to the dial to the maximum torque reading in a given instant and leaving said needle at said reading, and means including a frictional connection with the needle for positioning the needle relative to the protuberance to make the needle selectively operative with either a clockwise or a counter-clockwise torque.

7. A torque gauge comprising a pair of members mounted for mutual relative rotation, a resilient load interconnecting the members and urging them to a neutral position from both rotational directions, one of the members having calibration markings extending in both directions and the other having a marker registering with said markings to indicate applied torques, a needle mounted for rotation on one of said members with a torque resistance at least as low as the torque corresponding to the lowest valued calibration marking, a fixed element on the other member engaging the needle, and a manually operable member in frictional engagement with the needle to rotate the needle to a position on one of the respective sides of the fixed element to set the gauge for operation in one direction, the frictional engagement of the needle and the manually operable member limiting the force applied to the needle in manual resetting when the needle abuts against the fixed element.

8. The gauge of claim 7 wherein the needle is mounted in the center of the end of said one member and the fixed element engages the needle at the outer end thereof to minimize inherent error and the added torque load imposed by the needle.

9. In a torque gauge having a pair of members mounted for mutual relative rotation, a resilient element interconnecting the members and opposing manual rotation, a calibrated scale on one of the members, an indicator member rotatably mounted on said one member, and an abutment on the other member engaging the indicator member to drive the indicator member over the scale in response to relative rotation to record the maximum rotation, the improvement comprising a manually operable resetting member frictionally coupled to the indicator, the force which may be manually applied to the indicator when the indicator strikes the abutment in resetting being limited to the force producing slippage at said frictional coupling.

10. In a torque gauge having a pair of members mounted for mutual relative rotation, a resilient element interconnecting the members and opposing mutual rotation, a calibrated scale on one of the members, and indicator member rotatably mounted on said one member, and an abutment on the other member engaging the indicator member to drive the indicator member over the scale in response to relative rotation to record the maximum rotation, the improved construction wherein the indicator is pivotally mounted in a bearing which is in turn mounted in the center of the end of said one member, said end having the scale thereon in a plane perpendicular to the axis of the gauge, the indicator extending radially from said center throughout its length, and the abutment engaging the indicator at the periphery of the scale, so that the load imposed by the indicator on the gauge is minimized.

References Cited in the file of this patent
UNITED STATES PATENTS

| 2,256,478 | Hill | Sept. 23, 1941 |
| 2,577,491 | Teter | Dec. 4, 1951 |
| 2,607,219 | Millard et al. | Aug. 19, 1952 |